(12) United States Patent
Diolaiti

(10) Patent No.: US 6,666,035 B1
(45) Date of Patent: Dec. 23, 2003

(54) METHOD AND SYSTEM FOR COOLING AND EFFECTING A CHANGE IN STATE OF A LIQUID MIXTURE

(75) Inventor: Luigi Diolaiti, Alfonsine (IT)

(73) Assignee: Saitec S.r.l., Bologna (IT)

( * ) Notice: Subject to any disclaimer, the term of this patent is extended or adjusted under 35 U.S.C. 154(b) by 0 days.

(21) Appl. No.: 10/110,282

(22) PCT Filed: Sep. 29, 2000

(86) PCT No.: PCT/IT00/00384

§ 371 (c)(1),
(2), (4) Date: Mar. 27, 2002

(87) PCT Pub. No.: WO01/23814

PCT Pub. Date: Apr. 5, 2001

(30) Foreign Application Priority Data

Sep. 30, 1999 (IT) .......................... BO99A0527
Dec. 20, 1999 (IT) .......................... BO99A0695

(51) Int. Cl.$^7$ .................................. F25C 1/00
(52) U.S. Cl. ................... 62/66; 62/74; 62/347
(58) Field of Search .................. 62/66, 123, 74, 62/434, 531, 347

(56) References Cited

U.S. PATENT DOCUMENTS

| | | | |
|---|---|---|---|
| 1,970,437 A | | 8/1934 | Snitkin |
| 3,188,825 A | * | 6/1965 | Van Olphen .................. 62/123 |
| 3,298,612 A | * | 1/1967 | Torrens ...................... 239/14.2 |
| 3,364,690 A | | 1/1968 | Torobin |
| 3,813,892 A | * | 6/1974 | Johnson et al. ............. 62/535 |
| 4,284,239 A | * | 8/1981 | Ikeuchi ........................... 239/8 |
| 4,488,407 A | * | 12/1984 | Delano ............................ 62/74 |
| 4,584,843 A | * | 4/1986 | Pronger et al. ............... 62/123 |
| 4,596,120 A | * | 6/1986 | Knodel et al. ................. 62/59 |
| 4,597,876 A | | 7/1986 | Hall |
| 4,754,610 A | * | 7/1988 | Knodel et al. ................. 62/74 |
| 4,761,962 A | * | 8/1988 | Andersson ...................... 62/63 |
| 4,799,622 A | * | 1/1989 | Ishikawa et al. ......... 239/102.2 |
| 4,838,039 A | * | 6/1989 | Knodel ......................... 62/330 |
| 5,152,457 A | | 10/1992 | Burwell et al. |
| 5,218,828 A | * | 6/1993 | Hino .............................. 62/59 |
| 5,283,989 A | | 2/1994 | Hisasue et al. |
| 5,307,640 A | | 5/1994 | Fawzy et al. |
| 5,449,502 A | * | 9/1995 | Igusa et al. ................. 422/292 |
| 5,531,157 A | | 7/1996 | Probst |
| 5,624,530 A | * | 4/1997 | Sadykhov et al. ............ 159/3 |
| 5,737,928 A | * | 4/1998 | Lee et al. ....................... 62/59 |

FOREIGN PATENT DOCUMENTS

| | | | |
|---|---|---|---|
| GB | 1559920 | | 1/1980 |
| JP | 357012847 A | * | 1/1982 |
| JP | 361138514 A | * | 6/1986 |
| WO | WO 93/13674 | | 7/1993 |

OTHER PUBLICATIONS

Tao Nenryo Kogyo KK; Liquid Atomizer, Sep. 12, 1988, Patent Abstract of Japan (Abstract).

* cited by examiner

Primary Examiner—William E. Tapolcai
Assistant Examiner—Mohammad M. Ali
(74) Attorney, Agent, or Firm—William J. Sapone; Coleman Sudol Sapone, P.C.

(57) ABSTRACT

A method and system for cooling and effecting a change of state of a liquid mixture, wherein the liquid mixture is atomized to form an atomized liquid mixture, which is cooled to change its physical state, the cooling being performed using substantially gaseous coolant.

19 Claims, 3 Drawing Sheets

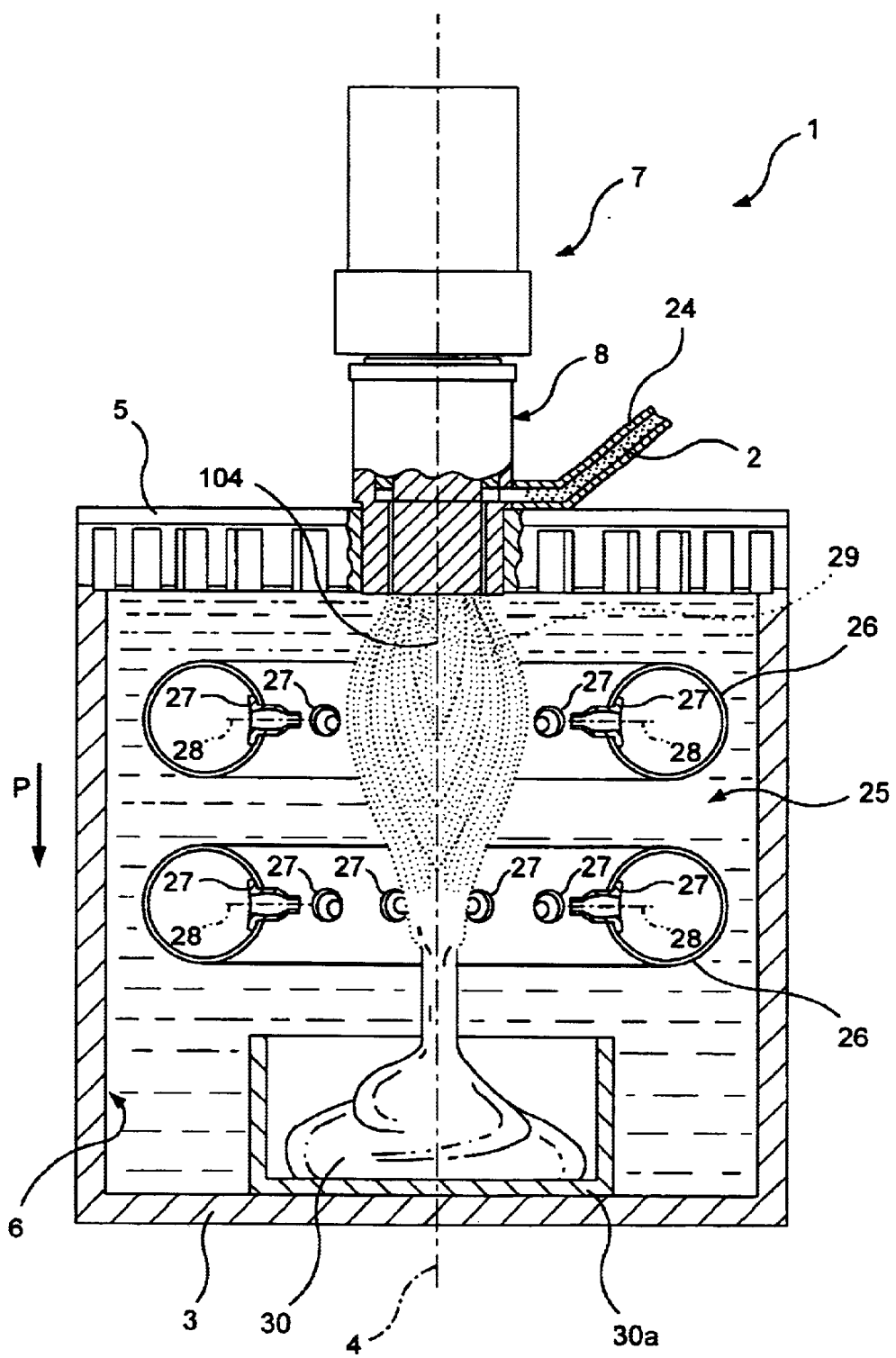
F I G. 1

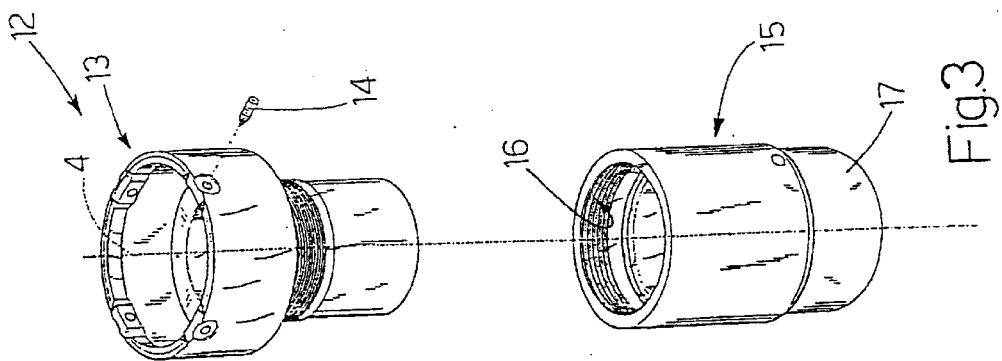
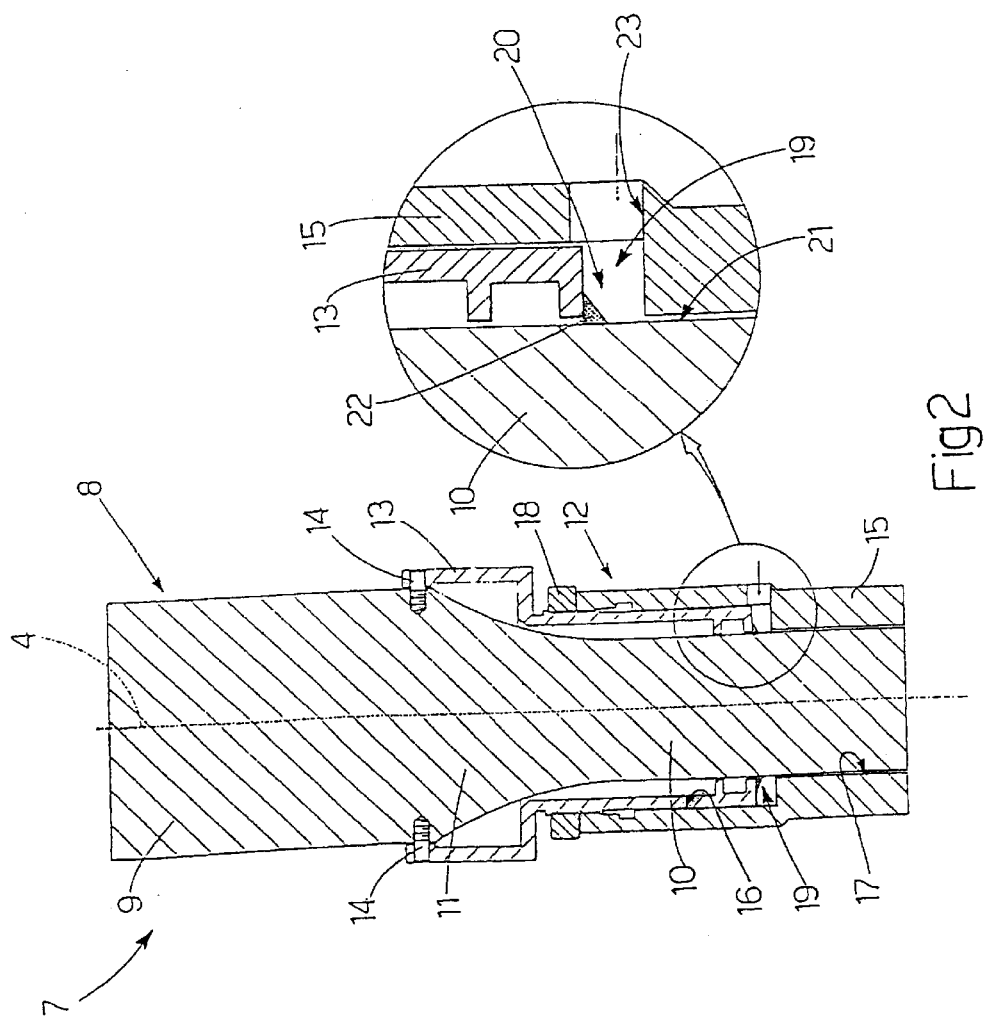

METHOD AND SYSTEM FOR COOLING AND EFFECTING A CHANGE IN STATE OF A LIQUID MIXTURE

TECHNICAL FIELD

The present invention relates to a method of cooling and effecting a change in state of a liquid mixture, in particular a liquid mixture for food, drugs, fertilizers, detergents, cosmetics, catalysts, enzymes or parasiticides.

BACKGROUND ART

Two types of systems are normally used for cooling and effecting a change in state of a liquid mixture.

In a first, the liquid mixture is placed and kept inside a vessel having a cooled inner surface, until the mixture is cooled to other than the liquid state.

In the second, the liquid mixture is fed along a cooling tunnel having a cooled inner surface and long enough to cool and effect a change in state of the liquid mixture.

Since the liquid mixture has a relatively small cooling surface and cools progressively inwards from the outermost layers, the above known systems have several drawbacks, foremost of which is the relatively long time taken to cool and effect a change in state of the liquid mixture.

A further drawback of the above known systems lies in output being proportional to the size of the cooling vessel and tunnel, so that, to achieve a relatively high output, the systems must be fairly large, and are therefore expensive to produce as well as to run in terms of energy consumption.

Apparatuses for the rapid freezing of liquids which partially overcome the aforementioned drawbacks are disclosed in EP-A-0659351 and U.S. Pat. No. 1,970,437.

EP-A-0659351 discloses an apparatus for the rapid freezing of liquids comprising an atomizer defined by at least one nozzle and able to atomize a liquid mixture in a freezing turret. The turret is provided with a plurality of nozzles, which supply to the interior of the turret cooling means able to effect a change in state of the liquid mixture.

U.S. Pat. No. 1,970,437 discloses an apparatus for the rapid freezing of liquids comprising an atomizer defined by a shower bath, a Segner wheel, a pulverizer, or a sprinkler and able to atomize a liquid in a freezing turret. The turret is provided with a plurality of pipes which supply to the interior of the turret cooled air able to effect a change in state of the liquid mixture.

However, due to the fact that in the apparatuses disclosed in EP-A-0659351 and in U.S. Pat. No. 1,970,437 the liquid mixture is atomized under pressure, such apparatuses have to be provided with very long freezing turrets, which are cumbersome and expensive.

DISCLOSURE OF INVENTION

It is an object of the present invention to provide a method of cooling and effecting a change in state of a liquid mixture, designed to eliminate the aforementioned drawbacks.

According to the present invention, there is provided a method of cooling and effecting a change in state of a liquid mixture as recited in claim 1.

The present invention also relates to a system for cooling and effecting a change in state of a liquid mixture.

According to the present invention, there is provided a system for cooling and effecting a change in state of a liquid mixture as recited in claim 14.

A BRIEF DESCRIPTION OF THE DRAWINGS

A number of non-limiting embodiments of the present invention will be described by way of example with reference to the accompanying drawings, in which:

FIG. 1 shows a partly sectioned side view of a preferred embodiment of the system according to the present invention;

FIG. 2 shows an axial section, with parts enlarged for clarity, of a detail in FIG. 1;

FIG. 3 shows an exploded view in perspective of a detail in FIG. 2;

BEST MODE FOR CARRYING OUT THE INVENTION

Figure 4:
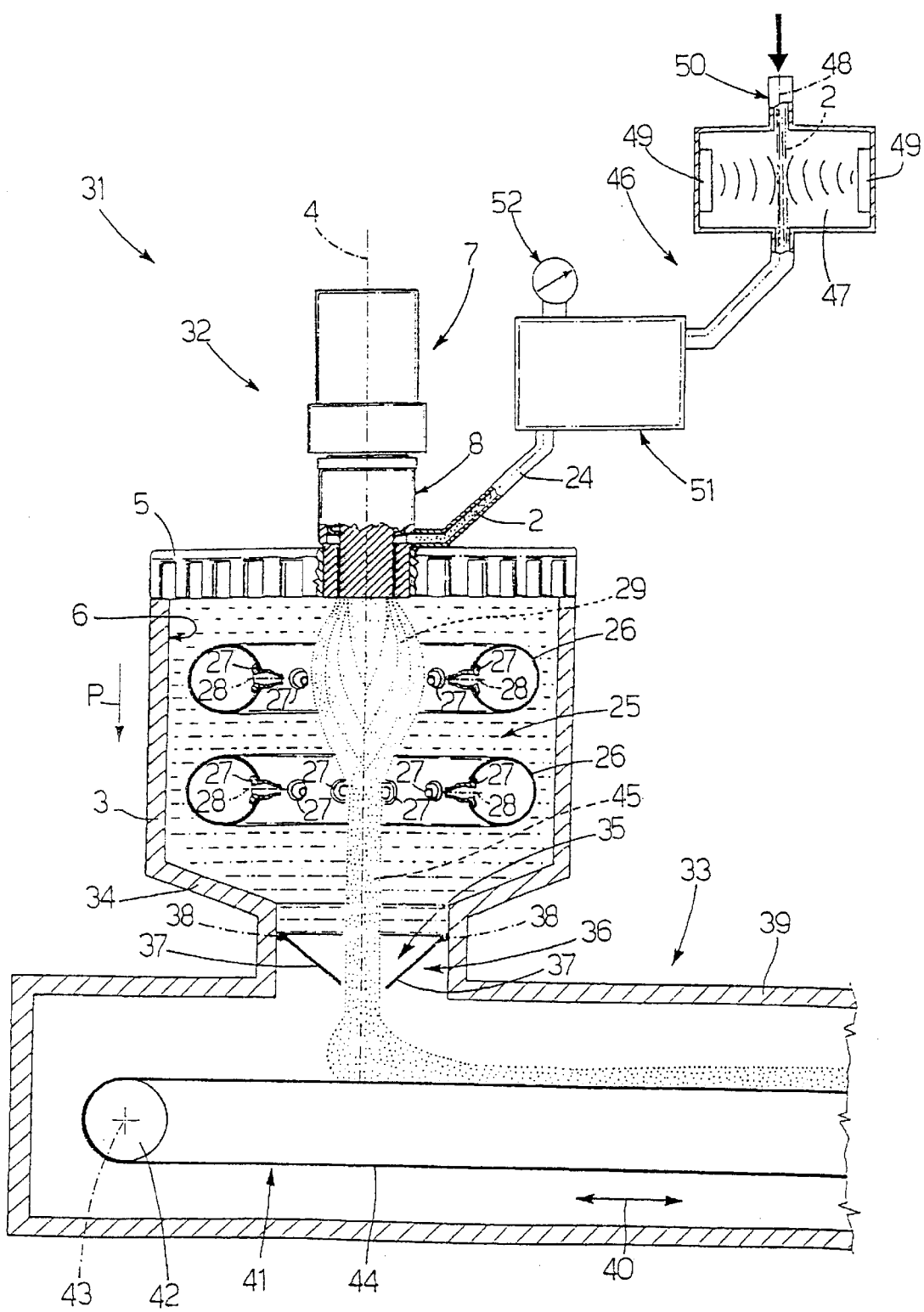
FIG. 4 shows a partly sectioned side view of a further embodiment of the system according to the present invention.

Number 1 in FIG. 1 indicates as a whole a system for cooling and effecting a change in state of a liquid mixture 2 for food, drugs, fertilizers, detergents, cosmetics, catalysts, enzymes or parasiticides.

System 1 comprises a cylindrical, substantially cup-shaped vessel 3 having a substantially vertical longitudinal axis 4 and defined at the top by a cover 5, which is perpendicular to axis 4 and defines, together with vessel 3, a cooling chamber 6.

System 1 also comprises a known ultrasonic atomizing device 7 (FIGS. 2 and 3), which is fitted to cover 5, extends through cover 5 to face the inside of chamber 6, and in turn comprises a cylindrical member 8 vibrating, in known manner not shown, at a vibration frequency within the ultrasonic frequency spectrum and preferably ranging between 15 kHz and 150 kHz. Member 8 is substantially coaxial with axis 4, and comprises a wide top portion 9, a narrow bottom portion 10, and an intermediate portion 11 connecting portions 9 and 10.

Device 7 also comprises a tubular header 12 extending substantially along portions 10 and 11. Header 12 comprises a tubular body 13 mounted to slide axially along member 8 and fitted at one end to portion 9 by a number of screws 14 equally spaced about and extending crosswise with respect to axis 4. Header 12 also comprises a tubular body 15 coaxial with axis 4 and in turn comprising a wide top portion 16 extending about and screwed to body 13, and a narrow bottom portion 17 projecting from body 13 and surrounding portion 10. In this connection, it should be pointed out that, in use, portion 16 is positioned contacting a ring nut 18 screwed onto body 13 to selectively control the axial position of body 15 along body 13.

Device 7 also comprises an atomizing circuit 19 in turn comprising two annular chambers 20 and 21 arranged in series along axis 4. Chamber 20 is defined by bodies 13 and 15 and portion 10, is defined at the top by a sealing ring 22 extending about portion 10, and opens outwards through a hole 23 formed radially through body 15 to communicate with a conduit 24 (FIG. 1) for supplying liquid mixture 2; while chamber 21 is defined between portions 10 and 17, and extends along portion 10 so as to communicate with cooling chamber 6.

System 1 also comprises a cooling device 25 housed inside chamber 6 and in turn comprising two tubular rings 26 coaxial with axis 4. Each ring 26 is connected to a known liquid nitrogen supply device (not shown), and comprises a number of known nozzles 27, each of which has a respective longitudinal axis 28, is adjustable about respective axis 28 and about a further two axes (not shown) perpendicular to each other and to axis 28, and provides for atomizing and vaporizing the liquid nitrogen to produce a cooling current of substantially gaseous nitrogen.

Each nozzle 27 has a circular or rectangular outlet section, so that, by combining the shape of the outlet section of each nozzle 27 with the orientation of the nozzle with respect to axis 4, it is possible to select laminar or turbulent flow of the current of gaseous nitrogen produced by device 25.

Operation of system 1 will now be described with reference to FIG. 1, and as of when liquid mixture 2 is fed, by force of gravity and at substantially atmospheric pressure, along conduit 24 to atomizing device 7, in particular to circuit 19. Since all points of portion 10 vibrate, at circuit 19, at constant frequency and amplitude, and since the respective radial dimensions of chambers 20 and 21 are constant along axis 4, liquid mixture 2 is so atomized as to produce an atomized liquid mixture 29 comprising perfectly spherical drops of respective substantially uniform compositions.

It should also be pointed out that the diameter of each drop assumes a given value within a range of values controllable selectively by adjusting the vibration frequency and/or amplitude of member 8 and the radial dimension of chamber 21.

At the output of chamber 21, the atomized liquid mixture 29 flows by force of gravity along a path P parallel to axis 4 and through rings 26 of cooling device 25. At device 25, the atomized liquid mixture 29 comes into contact with said cooling current, which is emitted by nozzles 27 at a lower temperature than atomized liquid mixture 29, so as to cool and effect a change in state of atomized liquid mixture 29 and obtain a cooled mixture 30.

Finally, the cooled mixture 30 flows by force of gravity along axis 4, and is collected in a catch basin 30*a* at the bottom of chamber 6.

In connection with the above, it should be pointed out that:

the physical state of the atomized liquid mixture 29 at the output of device 25 may be selectively controlled by adjusting the liquid nitrogen supply and/or the temperature of cooling chamber 6 (in the example shown in FIG. 1, the cooled mixture 30 is in the form of a paste); and the cooling current may also be obtained using cooled air, cooled or liquefied inert gases, or carbon dioxide.

The FIG. 4 variation shows a system 31 comprising an atomizing and freezing unit 32 and a freeze drying unit 33.

Atomizing and freezing unit 32 differs from system 1 by chamber 6 comprising a substantially truncated-cone-shaped bottom end 34, and a bottom outlet channel 35 coaxial with axis 4 and having a preferably rectangular or square cross section.

Unit 32 also comprises a device 36 for opening and closing channel 35, and in turn comprising two oscillating walls 37, which extend perpendicular to the FIG. 4 plane, are mounted inside channel 35, and are oscillated—by a known actuating device (not shown), with respect to vessel 3, and about respective parallel axes 38 perpendicular to the FIG. 4 plane—between an open position (FIG. 4) and a closed position (not shown) respectively opening and closing channel 35.

Freeze drying unit 33 comprises a known freeze drying tunnel 39 extending beneath unit 32 in a direction 40 crosswise to axis 4, and communicating with chamber 6 by means of channel 35; and a supply device 41 extending inside tunnel 39 and parallel to direction 40.

Device 41 comprises two pulleys 42 (only one shown in FIG. 4), one of which is powered, and which are fitted to a fixed frame (not shown) to rotate continuously about respective parallel axes 43 parallel to axes 38; and a conveyor belt 44 looped about pulleys 42 and facing channel 35. It should be pointed out that the freeze drying step in unit 33 may be performed using, in known manner not shown, the same freezing current already used in device 25, and which, at the output of unit 32, is substantially defined exclusively by dry gaseous nitrogen, i.e. having no humidity.

Operation of system 31 will now be described assuming device 25 is set to obtain a frozen mixture 45 at the output of device 25 itself, walls 37 of device 36 are set to the open position opening channel 35, and belt 44 is moving beneath channel 35.

At the output of device 25, the frozen mixture 45 flows by force of gravity along axis 4 and channel 35 onto belt 44, and is fed continuously along freeze drying tunnel 39, inside which the frozen mixture 45 is freeze dried at atmospheric pressure in known manner.

In a variation not shown, at the output of channel 35, the frozen mixture 45 is collected in a tank and vacuum freeze dried in known manner.

Systems 1 and 31 afford several advantages, foremost of which are the following:

ultrasonic atomizing device 7 provides for obtaining an atomized liquid mixture 29 comprising a number of drops, in each of which the components of liquid mixture 2 are distributed homogeneously, and each of which is perfectly spherical and relatively small in diameter;

the drops defining atomized liquid mixture 29 together form a relatively extensive exchange surface, thus ensuring relatively effective heat exchange between atomized liquid mixture 29 and said gaseous nitrogen current; and the change in state of atomized liquid mixture 29 is effected immediately downstream from the output of atomizing device 7, i.e. when the atomized liquid mixture 29 is perfectly homogenous, thus preventing any further separation of the components of atomized liquid mixture 29.

System 31 also has the further advantage of the shape and diameter of the drops forming frozen mixture 45 also ensuring relatively effective heat exchange at the freeze drying step.

Moreover, when freeze drying at atmospheric pressure, the drops forming frozen mixture 45 can be freeze dried completely and homogeneously without being excessively overheated, and without altering and/or damaging the composition of the freeze dried drops; whereas, when vacuum freeze drying, the duration, and hence cost, of the freeze drying step may be relatively limited.

System 31 also has the further advantage of atomizing liquid mixture 2, freezing atomized liquid mixture 29, and freeze drying frozen mixture 45 substantially continuously, thus greatly reducing the duration of the overall freeze drying cycle on system 31.

With reference to FIG. 4, it should be pointed out that system 31 may also comprise a unit 46 for eliminating bacteria in liquid mixture 2 and located upstream from atomizing and freezing unit 32. In a variation not shown, system 1 may also be provided with a unit 46.

Unit 46 (of known type) comprises a chamber 47 having a longitudinal axis 48 substantially parallel to axis 4, and two ultrasonic transducers 49 housed inside chamber 47, on opposite sides of axis 48; a supply conduit 50 for feeding liquid mixture 2 into chamber 47 at a pressure greater than atmospheric pressure; and a holding tank 51 located between chamber 47 and unit 32, connected to atomizing device 7 by conduit 24, and having a pressure regulator 52.

In actual use, liquid mixture 2 is fed successively:

into chamber 47, where the two transducers 49 provide for eliminating bacteria in known manner;

into tank 51, where pressure regulator 52 reduces the pressure of liquid mixture 2 to atmospheric pressure; and finally into unit 32, where the freeze drying cycle is performed as described for system 31.

Finally, it should be pointed out that the foregoing description also applies in the event a solid-state component is dispersed in liquid mixture 2, which component is microencapsulated inside the atomized drops in the course of the atomizing step performed in atomizing device 7.

What is claimed is:

1. A system for cooling and effecting a change in state of a liquid mixture, the system comprising atomizing means for atomizing a liquid mixture to form an atomized liquid mixture, cooling means for cooling the atomized liquid mixture to form a cooled mixture having a physical state other than the liquid state, the cooling means employing substantially gaseous coolant means, the atomizing means being ultrasonic atomizing means, collecting means for collecting the cooled mixture, the atomizing means, cooling means and collecting means being located successively in that order along a given path, the atomizing means having an outlet having a longitudinal axis substantially parallel to the path, the cooling means comprising at least one nozzle arranged about the longitudinal axis for releasing the coolant means, each nozzle having a respective longitudinal first axis, each nozzle being adjustable about the first axis and about two axes perpendicular to the first axis.

2. The system of claim 1 wherein the path extends in a substantially vertical direction.

3. The system of claim 2 further comprising freeze drying means for substantially dehydrating the cooled mixture.

4. The system of claim 3 wherein the freeze drying means comprise a freeze drying tunnel, the collecting means feeding the cooled mixture continuously through the freeze drying tunnel.

5. The system of claim 2 further comprising bacteria eliminating means for eliminating bacteria in the liquid mixture, feed means for feeding the liquid mixture to the bacteria eliminating means at a first pressure substantially greater than atmospheric pressure.

6. The system of claim 5 wherein the bacteria eliminating means comprise ultrasonic means.

7. The system of claim 6 further comprising further feed means for feeding the liquid mixture to the atomizing means at a second pressure substantially different from the first pressure.

8. The system of claim 2 wherein the liquid mixture is selected from the group consisting of food, cosmetic, drug, fertilizer, detergent, catalyst, enzyme and parasiticide liquids.

9. A method for cooling and effecting a change in state of a liquid mixture, the method comprising: atomizing a liquid mixture to form an automized liquid mixture using ultrasonic atomizing means having a selected vibration frequency and a selected vibration amplitude; cooling the atomized liquid mixture to form a cooled mixture having a physical state other than the liquid state using substantially gaseous coolant means; collecting the cooled mixture, performing the atomizing, cooling and collecting successively along a given path, flowing the liquid mixture, atomized liquid mixture and cooled mixture continuously along the path, and, providing the atomizing means with an outlet having a longitudinal axis substantially parallel to the path, and, cooling the atomized mixture by releasing the coolant means, using one or more nozzles, arranged about the longitudinal axis, each nozzle having a longitudinal first axis and being adjustable about the first axis and about two axes perpendicular to the first axis.

10. The method of claim 9 wherein the liquid mixture, atomized liquid mixture and cooled mixture flow by gravity along the path.

11. The method of claim 10 further comprising selectively controlling the physical state of the cooled mixture by adjusting a supply of the coolant means.

12. The method of claim 10 wherein the vibration frequency ranges between 15 kHz and 150 kHz.

13. The method of claim 10 wherein, during atomizing, micronizing the liquid mixture into drops having diameters falling within a given range of diameters, controlling the range of diameters by regulating the vibration frequently and/or vibration amplitude.

14. The method of claim 10 further comprising freeze drying the cooled mixture to substantially dehydrate the cooled mixture.

15. The method of claim 10 further comprising eliminating bacteria in the liquid mixture.

16. The method of claim 10 further comprising eliminating bacteria in the liquid mixture using further ultrasonic means and feeding the liquid mixture to the further ultrasonic means at a first pressure substantially greater than atmospheric pressure.

17. The method of claim 16 further comprising feeding the liquid mixture to the ultrasonic atomizing means at a second pressure substantially different from the first pressure.

18. The method of claim 10 further comprising having a solid-state component dispersed in the liquid mixture, microencapsulating the solid-state component in drops during atomizing, the drops having diameters falling within a given range of diameters, controlling the range of diameters by regulating the vibration frequently and/or vibration amplitude.

19. The method of claim 10 wherein the liquid mixture is selected from the group consisting of food, cosmetic, drug, fertilizer, detergent, catalyst, enzyme and parasiticide liquids.

* * * * *